US009280157B2

(12) United States Patent
Wurman et al.

(10) Patent No.: US 9,280,157 B2
(45) Date of Patent: Mar. 8, 2016

(54) SYSTEM AND METHOD FOR TRANSPORTING PERSONNEL WITHIN AN ACTIVE WORKSPACE

(71) Applicant: Amazon Technologies, Inc., Reno, NV (US)

(72) Inventors: Peter R. Wurman, Acton, MA (US); Michael T. Barbehenn, North Reading, MA (US); Matthew David Verminski, North Andover, MA (US); Michael Cordell Mountz, Lexington, MA (US); Dennis Polic, North Reading, MA (US); Andrew Edward Hoffman, Lunenburg, MA (US); James Raymond Allard, Newton, MA (US); Eryk Brian Nice, Medford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 52 days.

(21) Appl. No.: 14/018,317

(22) Filed: Sep. 4, 2013

(65) Prior Publication Data

US 2015/0066283 A1 Mar. 5, 2015

(51) Int. Cl.
*G05D 1/02* (2006.01)
*B65G 1/02* (2006.01)
*B65G 1/00* (2006.01)

(52) U.S. Cl.
CPC ............... *G05D 1/0214* (2013.01); *B65G 1/00* (2013.01); *B65G 2207/40* (2013.01); *G05D 2201/0212* (2013.01); *G05D 2201/0216* (2013.01)

(58) Field of Classification Search
CPC ........... A61G 1/0275; G05B 19/41895; G05D 2201/0216; G06Q 10/087
See application file for complete search history.

(56) References Cited

U.S. PATENT DOCUMENTS

| 7,841,269 | B1* | 11/2010 | Jacobs | 89/36.08 |
| 2002/0101363 | A1* | 8/2002 | Ogura et al. | 340/932.2 |
| 2005/0062604 | A1* | 3/2005 | Fong et al. | 340/539.23 |
| 2005/0131645 | A1 | 6/2005 | Panopoulos | |
| 2005/0183569 | A1* | 8/2005 | Solomon | 89/1.11 |
| 2007/0293978 | A1* | 12/2007 | Wurman et al. | 700/213 |

(Continued)

FOREIGN PATENT DOCUMENTS

WO WO2013/11297 A1 8/2013

OTHER PUBLICATIONS

PCT Search Report & Written Opinion for Appl. No. PCT/US2014/053944, dated Nov. 26, 2014, 8 pages.

*Primary Examiner* — John R Olszewski
*Assistant Examiner* — Jason Roberson
(74) *Attorney, Agent, or Firm* — Lee & Hayes, PLLC

(57) ABSTRACT

Disclosed herein is a human transport device and associated system to transport a user within an active workspace. The human transport device may include a platform to support a user, an enclosure coupled to the platform to surround the user, a drive subsystem to power the human transport device, and a control unit to control the movement of the human transport device in coordination with active mobile drive units moving within the workspace. A system implementing one or more human transport devices may include a management module to direct the movement of the one or more human transport devices and designate one or more areas within the workspace as protected areas. Unauthorized objects may be prohibited from entering the protected areas while the human transport device may be allowed within the protected areas.

17 Claims, 9 Drawing Sheets

(56) References Cited

U.S. PATENT DOCUMENTS

| | | |
|---|---|---|
| 2012/0065762 A1 | 3/2012 | Pillarisetti |
| 2012/0188100 A1* | 7/2012 | Min et al. .................... 340/932.2 |
| 2014/0150806 A1* | 6/2014 | Hu et al. ....................... 128/870 |

* cited by examiner

SYSTEM AND METHOD FOR TRANSPORTING PERSONNEL WITHIN AN ACTIVE WORKSPACE

BACKGROUND

Technological advancements have made an ever-increasing amount of automation possible in inventory-handling and other types of material-handling systems. Namely, inventory-handling systems may be implemented using automated mobile drive units that are assigned to inventory-related tasks. The level of human involvement with such automated systems has been greatly reduced, leading to increased speed, throughput, and productivity. However, there may be circumstances where it is necessary for human operators to traverse, or otherwise go onto, an active workspace where the mobile drive units are carrying out their assigned inventory-related tasks. For example, mobile drive units or other equipment may fail or break down, or inventory items may fall out of their respective inventory holders onto the active workspace floor, requiring human operators to traverse the workspace to the location where the maintenance or cleanup is needed. However, traversing an active workspace of automated mobile drive units poses safety concerns for the human operators who traverse the active workspace.

Currently, automated inventory systems may be configured to shut down the entire active workspace, whereby all of the mobile drive units on the workspace floor are stopped and prevented from moving. While the mobile drive units are disabled, one or more human operators may traverse the workspace floor to a destination on or across the floor. Although this method is safe for the human operator, shutting down the entire inventory system is a great disruption to the inventory system that causes unnecessary downtime where no inventory-related tasks can be performed.

Other inventory systems may allow for a pathway to be reserved from the edge of an active workspace floor to a destination wherein no mobile drive units are allowed to move such that a human may traverse the active floor along the pathway without disrupting the remainder of the active workspace. Although this method is less disruptive than an entire system shutdown, a less intrusive means of allowing a human operator on an active floor is still needed.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Embodiments of the present disclosure are directed to, among other things, techniques and systems for transporting one or more users within an active workspace.

In some embodiments, a human transport device configured to transport a user within a workspace includes a platform to support the user, and an enclosure coupled to the platform to surround the user when the user is situated within the enclosure and on the platform. The human transport device may further include a drive subsystem to power the human transport device for movement, and a control unit to control the movement of the human transport device in coordination with active mobile drive units, (sometimes referred to herein as "drive units"), moving within the workspace. The drive subsystem may be integral to the human transport device, or may be an autonomous mobile drive unit configured to lift and transport a portable cabin with a user therein, the combination of the autonomous mobile drive unit and the portable cabin making up the human transport device.

In some embodiments, a system to transport a user within a workspace includes a human transport device to transport the user to a destination location within the workspace, and a management module to direct movement of the human transport device with the user therein to the destination location in coordinated movement with active mobile drive units moving within the workspace.

In some embodiments, a process to transport a user within a workspace includes identifying a destination location within the workspace, and moving the human transport device with a user therein to the destination location in coordinated movement with active mobile drive units moving within the workspace. The process may further include designating one or more areas within the workspace as protected areas, prohibiting unauthorized objects from entering the protected areas, and allowing the human transport device to be within the protected areas.

The human transport device of the embodiments disclosed herein allows human users (e.g., maintenance workers) to traverse an active workspace in a minimally intrusive manner while maintaining safety of the user while he/she is within the active workspace. By coordinating movement of the human transport device with the movement of active mobile drive units that are carrying out inventory-related tasks, the productivity on the floor is minimally disrupted. Furthermore, by designation of one or more protected areas within the workspace, the area in the workspace that is reserved for the human transport device can be minimized so as to allow for maximum productivity within the remainder of the workspace outside of the protected areas.

The techniques described herein may be implemented in a number of ways. Example implementations are provided below with reference to the following figures.

Example Architecture

Figure 1:
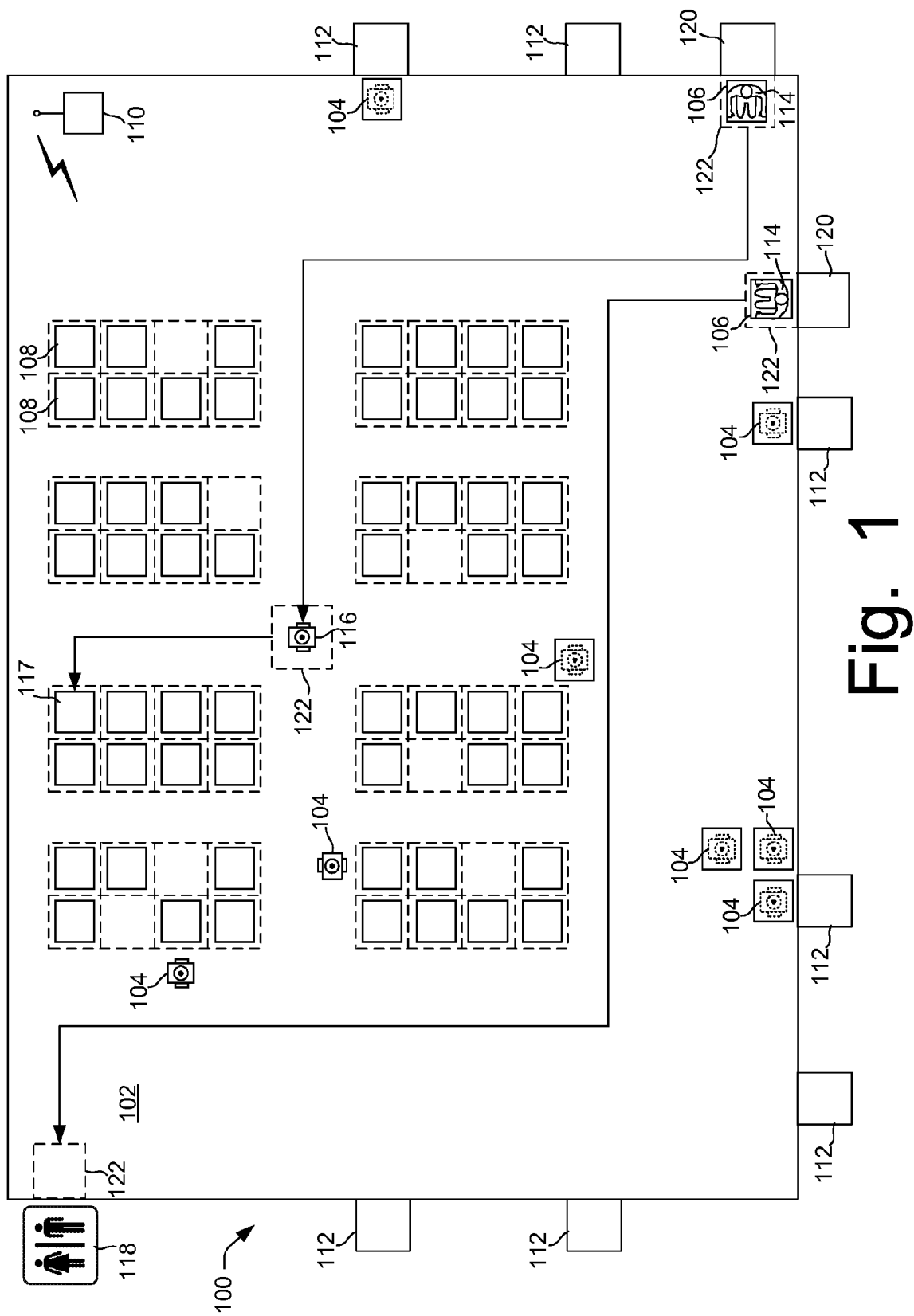
FIG. 1 illustrates an example inventory system configured to transport users within a workspace via human transport devices.

FIG. 1 illustrates an example inventory system 100 according to an embodiment. The inventory system 100 may represent any type of inventory system or material-handling system for storing and processing inventory items. For example, the inventory system 100 may include, but is not limited to, a mail-order warehouse facility, a merchandise return facility, an airport luggage facility, a manufacturing facility, or any other similar type of system.

The inventory system 100 may include a workspace 102 that represents an area associated with the inventory system 100 where components typically operate and/or move about. For example, the workspace 102 may represent all or part of the floor of a mail-order warehouse in which the inventory system 100 operates. One or more mobile drive units 104 and one or more human transport devices 106 may be configured to move within the workspace 102, and/or one or more inventory holders 108 may be stored within the workspace.

It is to be appreciated that the workspace 102 may be of variable dimensions and/or arbitrary geometry, and in particular may represent a two-dimensional (2D) workspace (e.g., a floor) or a three-dimensional (3D) workspace. Furthermore, the workspace 102 may be entirely enclosed in a building, or alternatively, some or all of the workspace 102 may be located outdoors, within a vehicle (e.g., a cargo ship), or otherwise unconstrained by any fixed structure.

Moreover, in some embodiments, the workspace 102 may include multiple portions that are physically separated from one another, including but not limited to separate floors, rooms, buildings, and/or portions divided in any other suitable manner. In some embodiments, stairs, ramps, and/or conveyance equipment such as vertical or horizontal conveyors, trucks, ferries, gondolas, escalators, elevators, and the like, may be included in the workspace 102 to allow components and/or users of the inventory system 100 to access the various separate portions of the workspace 102.

The inventory holders 108 may store one or more types of inventory items. The inventory system 100 may be capable of moving these inventory items between locations within the workspace 102 to facilitate entry, processing, and/or removal of inventory items from the inventory system 100 and the completion of other tasks involving inventory items. "Inventory items," as used herein, may represent any objects of a particular type that are suitable for storage, retrieval, and/or processing in an automated inventory system, such as the inventory system 100 of FIG. 1. For example, inventory items may include merchandise, pieces of luggage, components of a manufacturing kit, etc.

The inventory holders 108 may be capable of being carried, rolled, and/or otherwise moved by the mobile drive units 104. In general, the mobile drive units 104 are configured to transport the inventory holders 108 between points within the workspace 102 in response to commands communicated by a management module 110. Accordingly, the inventory system 100 may further include one or more inventory stations 112 where particular tasks involving inventory items can be completed. Such tasks may include the removal of inventory items from the inventory holders 108, the introduction of inventory items into the inventory holders 108, the counting of inventory items in the inventory holders 108, and similar inventory-related tasks.

As noted above, there may be circumstances where it is necessary for users 114 to traverse the workspace 102. For instance, a failed mobile drive unit 116 or a drive unit charging station 117 may alert the management module 110 that it is in need of maintenance, or a mobile drive unit 104 or other component of the inventory system 100 may detect fallen inventory items within the workspace 102. As another example, a user 114 may request transport within the workspace 102 to get to a destination location within or across the workspace, such as a restroom 118 located a significant distance from the user 114. Accordingly, the human transport devices 106 are configured to transport users 114 between points within the workspace 102 in a manner that is minimally intrusive to the ongoing production and operation of the inventory system 100. The inventory system 100 may also be configured to provide requisite safety to the users 114 that utilize the human transport devices 106 while within the active workspace 102.

In some embodiments, the management module 110 may interact with the human transport devices 106 to ensure that the human transport devices 106 arrive at a specified destination location with minimal disruption to the active mobile drive units 104 that are moving inventory items within the workspace 102. Specifically, when a human transport device 106 is to transport a user 114 to a destination location, the management module 110 is configured to direct the movement of the human transport device 106 within the workspace 102 in coordination with the movement of the active mobile drive units 104 within the workspace 102. For example, the management module 110 may be configured to plan routes of the human transport devices 106 within the workspace 102, designate areas of the workspace 102 as protected areas restricted for occupancy by particular human transport devices 106, and communicate relevant information to the human transport devices 106 to direct their movement among the mobile drive units 104 and inventory holders 108 positioned throughout the workspace 108.

In some embodiments, the inventory system 100 may further include one or more user stations 120. The user stations 120 represent physical locations where a user 114 may enter or exit a human transport device 106 depending upon whether the human transport device 106 is departing from, or arriving at, the user station 120. The user stations 120 may be located at any suitable location, such as a perimeter of the workspace 102 that is designated as an "inactive" portion of the inventory system 100. The mobile drive units 104 may be prohibited from entering inactive portions of the inventory system 100 to provide a safe area for users 114 to reside and move about. Additionally, or alternatively, the user stations 120 may be located at other locations, such as in the middle of the workspace 102 and within an inactive portion of the inventory system 100. Regardless of the locations of the user stations 120, the human transport devices 106 may be configured to remain parked, or idling, at or near the user stations 120 until a user 114 enters or boards the human transport device 106 for transport to a destination location.

In some embodiments, the users 114 may enter/exit the human transport devices 106 at locations other than the designated user stations 120. For instance, the users 114 may be associated with computing devices that are configured to communicate with the management module 110 whereby a current location of the user 114 may be transmitted to the management module 110, and the management module 110 may then direct an available human transport device 106 to the transmitted location to pick up the user 114. Similarly, the user 114 may specify, via the computing device or an interface onboard the human transport device 106, a drop-off location other than a user station 120 where they desire to be dropped off. Accordingly, the computing devices associated with the users 114 may be equipped with one or more processors and memory to store applications and data, and may be implemented as any number of computing devices, including a personal computer, a laptop computer, a portable digital assistant (PDA), a mobile phone, a tablet computer, and so forth.

In some embodiments, the management module 110 is configured to generate and transmit tasks assignments to appropriate and available components of the inventory system 100 and to coordinate operation of the various components in completing the tasks assignments. For example, the management module 110 may create tasks assignments related to the transportation of users 114 via the human transport devices 106 between locations within the workspace 102. Tasks to be completed by the users 114 may include maintenance-related tasks such as maintenance of failed equipment including failed mobile drive units 116, charging stations 117 for mobile drive units 104, networking cabinets, etc., or even tasks relating to cleanup of fallen inventory items, etc. Other types of tasks may be user-centric, such as taking one or more users 114 (e.g., executives, new employees, etc.) on a tour of the inventory system 100, or a user 114 that requests transportation across the workspace 102 to a point of interest, such as a restroom 118, located a distance away from the user 114. It is to be appreciated that the management module 110 may be configured to generate other types of tasks assignments such as those related to scheduled recharging or replacement of mobile drive unit batteries, storage of empty inventory holders 108, designation of parking spaces for mobile drive units 104 and human transport devices 106, or any other operations associated with the functionality supported by the inventory system 100 and its various components.

In some embodiments, the management module 110 generates task assignments based, in part, on requests or alerts that the management module 110 receives from components of the inventory system 100 and/or from external components in communication with the management module 110. These requests or alerts may include, but are not limited to, maintenance alerts to fix or otherwise manage equipment (e.g., charging station 117) within the workspace 102, user requests to be transported within or across the workspace 102, and the like. For example, the management module 110 may generate task assignments in response to the occurrence of a particular event (e.g., in response to a failed mobile drive unit 116 alerting the management module 110 that it is in need of maintenance, a mobile drive unit 104 detecting objects or obstacles on the floor of the workspace 102 and alerting the management module 110, etc.).

In some embodiments, the task assignments transmitted to the human transport devices 106 include one or more destination locations associated with one or more tasks. The destination locations that are sent in the task assignments may be associated with a maintenance task, a user request or some other request or alert received by the maintenance module 110. For example, the task assignment may identify a destination location of the failed mobile drive unit 116, as shown in FIG. 1, that has alerted the maintenance module 110 of a maintenance-related need (e.g., failed drive mechanism, depleted power source, etc.). In addition, a destination location associated with the charging station 117 may be identified in the task assignment such that the human transport device 106 is to proceed to the charging station 117 after completion of the task related to the failed mobile drive unit 116.

The management module 110 may be further configured to designate one or more areas within the workspace 102 as protected areas 122. In general, unauthorized objects (e.g., unauthorized mobile drive units 104, inventory items, users 114, etc.) are prohibited from entering, or moving within, the protected areas 122, and a selected human transport device 106 is allowed to be within the protected area 122. The protected area 122 may be designated to surround the destination location related to a task assignment in the immediate vicinity of the destination location so as to keep unauthorized mobile drive units 104 and/or other objects from entering the protected area 122. The protected area 122 may be initially designated as small as possible to provide a suitable area around the destination location (e.g., location of the failed mobile drive unit 116), and then be expanded or enlarged once the selected human transport device 106 arrives at the destination location to complete the assigned task. In yet other embodiments, a protected area may be designated in the vicinity of (i.e., in proximity to) the selected human transport device 106 while the human transport device 106 is within the workspace 102, and the protected area may move with the human transport device 106 as the human transport device 106 moves within the workspace 102 to the destination location. It is to be appreciated, however, that in some scenarios, the protected areas 122 may not be necessary for the completion of a task involving a user 114 and an associated human transport device 106, such as when a human transport device 106 transports a user 114 across the workspace 102.

Example Implementation

Figure 2:
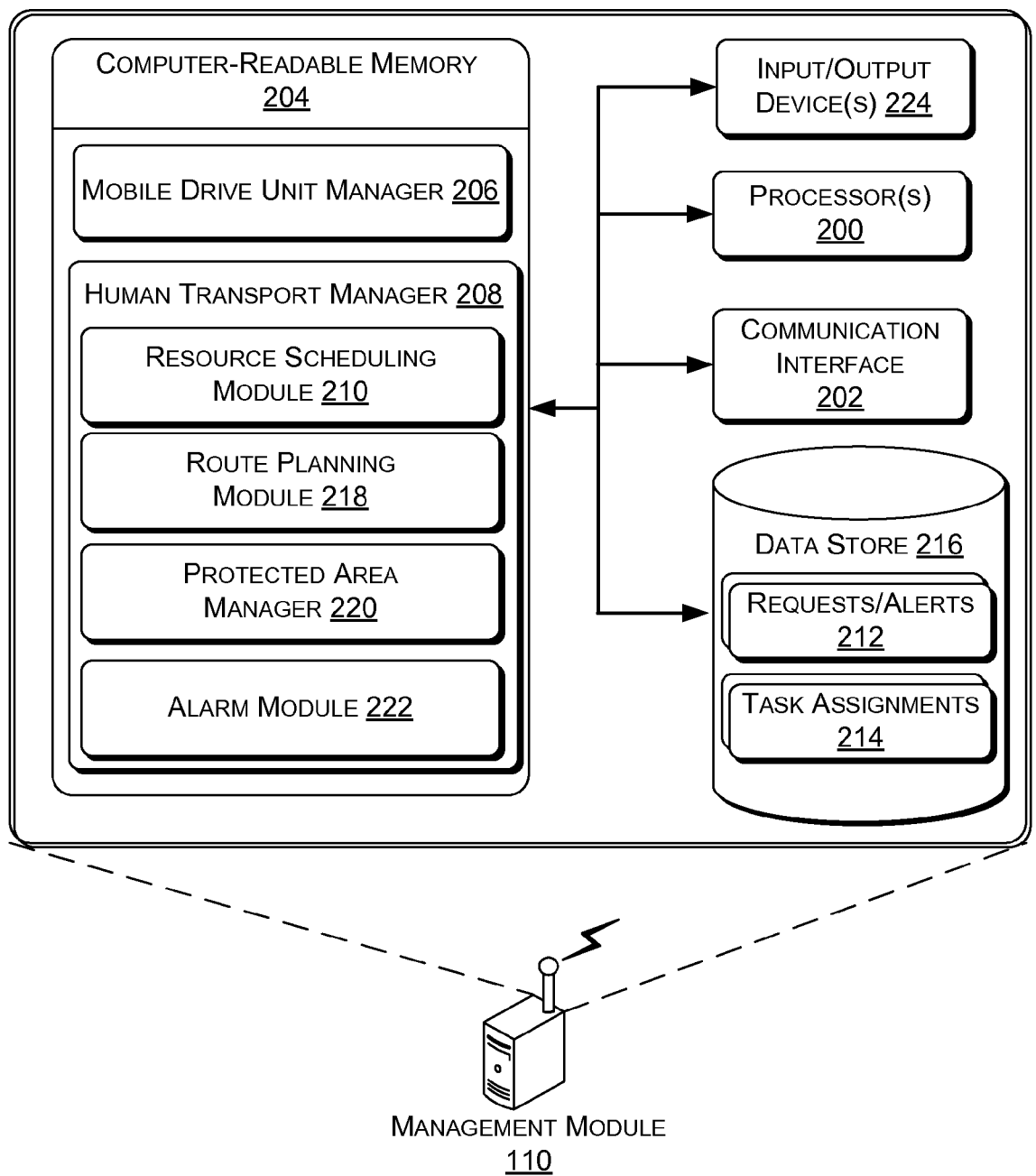
FIG. 2 is a block diagram illustrating an example management module implemented as part of the inventory system of FIG. 1.

FIG. 2 is a block diagram illustrating an example management module 110 implemented as part of the inventory system 100 of FIG. 1, showing example components of the management module 110 in greater detail. Although a single management module 110 is depicted in FIGS. 1 and 2, it is to be appreciated that the inventory system 100 may be implemented with more than one management module 110, perhaps arranged in a cluster for parallel computing purposes, and/or the management module 110 may include portions of the mobile drive units 104, human transport devices 106, or other elements of the inventory system 100. As shown in FIG. 2, the management module 110 may be equipped with one or more processors 200 configured to execute instructions associated with functionality provided by the management module 110. The processor(s) 200 may comprise one or more general purpose computers, dedicated microprocessors, or other processing devices capable of communicating electronic information. Examples of the processor(s) 200 include one or more application-specific integrated circuits (ASICs), field-programmable gate arrays (FPGAs), digital signal processors (DSPs), and any other suitable specific or general purpose processors.

The management module 110 may be configured to communicate with various components of the inventory system 100, including the mobile drive units 104 and the human transport devices 106. Accordingly, the management module 110 may include a communication interface 202 to facilitate such communication. The communication may be of any suitable form including wired and/or wireless communications. In some embodiments, the management module 110 may utilize communication protocols such as 802.11, Bluetooth®, Infrared Data Association (IrDA), or any suitable communication protocol to communicate suitable information to the components of the inventory system 100 via the communication interface 202. In some embodiments, the communication interface 202 may comprise a wireless transmitter, wireless receiver, network interface card, or a similar hardware component that may work in conjunction with appropriate software modules and the processor(s) 200 to facilitate communication of information to components of the inventory system 100.

The management module 110 may be further equipped with one or more forms of computer-readable memory 204. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, compact disc read-only memories (CD-ROMs), digital video discs (DVDs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The computer-readable memory 204 may be used to store any number of functional, or executable, components, such as programs and program modules that are executable on the processor(s) 200 to be run as software. Each component stored in the computer-readable memory 204 may comprise computer-executable instructions that, when executed, cause the one or more processors 200 to perform acts and to implement techniques described herein. Each component may be in the form of data structures, program modules, or other data. The components included in the computer-readable memory 204 may include a mobile drive unit manager 206 to manage the operation and movement of the mobile drive units 104 within the workspace 102 of FIG. 1. Particularly, the mobile drive unit manager 206 may be in charge of handling resource allocation, scheduling, and route planning for mobile drive units 104 to facilitate completion of assigned inventory-related tasks or general management operations of the mobile drive units (e.g., battery charging, parking in designated areas, etc.).

The computer-readable memory 204 may further include a human transport manager 208 to manage the operation of the human transport devices 106 within the workspace 102 of FIG. 1. In general, the human transport manager 208 is in charge of managing and selecting available human transport devices 106 to complete task assignments and make sure that the human transport devices 106 transport users 114 to associated destination locations within the workspace 102 safely, and with minimal disruption to the ongoing production and processing of inventory items within the workspace 102. Accordingly, the human transport manager 208 may include a resource scheduling module 210 to receive and process requests or alerts 212 relating to tasks involving the transportation of one or more users 114 within the active workspace 102. The resource scheduling module 210 may be configured to generate task assignments 214, to select available and appropriate human transport devices 106, and to assign the task assignments 214 to respective human transport devices 106 for completion of the tasks. For example, a failed drive unit, such as the failed drive unit 116 shown in FIG. 1, may transmit an alert 212 to the management module 110 that it is in need of maintenance by a user 114. The resource scheduling module 210 receives this alert 212, and in response, generates a task assignment 214 for a user 114 to fix the failed drive unit 116, selects an available human transport device 106 to transport the associated user 114 within the workspace 102 to a destination location of the failed drive unit 116, and communicates the task assignment 214 to the human transport device 106 via the communication interface 202. As such, the task assignments 214 may each include at least a destination location and a description or identifier of the type of task to be completed. In some embodiments, the task assignments 214 also identify an assigned user 114, such as a qualified technician for tasks that require qualified personnel. The selection of the particular human transport device 106 for each task may be based on the location of the selected human transport device 106, an indication that the selected human transport device 106 has completed a previously-assigned task, a predetermined schedule, and/or any other suitable consideration. In some embodiments, the alerts 212 may include alerts generated from external systems or components, such as a fire alarm for the facility in which the inventory system 100 is implemented. In such a scenario, the human transport manager 208 may be configured to direct movement of the human transport devices 106 in response to such an alert 212, such as by directing movement of the human transport devices 106 to a safe location where the users 114 may easily exit the facility and get themselves to safety.

As multiple requests/alerts 212 are received, and as task assignments 214 are generated by the resource scheduling module 210, these requests/alerts 212 and task assignments 214 may be stored in a data store 216. The management module 110 may prioritize the requests/alerts 212 according to various criteria such as the importance or urgency of the requests/alerts 212, the time (i.e., date and time) the requests/alerts 212 were received, the impact on the inventory system 102 of carrying out task assignments for the requests/alerts 212, the availability of qualified users 114 capable of handling the requests/alerts 212, etc. Additionally, the order and processing of the requests/alerts 212 in the data store 216 may be manually modified by human operators to allocate resources and assignments as the human operators see fit.

The resource scheduling module 210 may also be configured to generate task assignments related to the general maintenance of the human transport devices 106 themselves, such as prompting the human transport devices 106 to charge or replace batteries, instruct the human transport devices 106 to park or idle near a user station 120 and out of the way of heavy traffic flow of components of the inventory system, and the like.

The human transport manager 208 may further include a route planning module 218 to identify destination locations associated with a received request or alert 212 and to generate or plan a route to the identified destination location. For example, a user 114 may request, via their associated computing device, transport to a location such as the restroom 118. After a task assignment 214 is generated and a human transport device 106 is selected by the resource scheduling module 210, the route planning module 218 may identify a destination location within the workspace 102 in proximity to the restroom 118 and may then plan a route to transport the user 114 in the human transport device 106 from a starting location to the destination location near the restroom 118. In planning the route, the route planning module 218 may utilize knowledge of current congestion, historical traffic trends, task prioritization, and/or other appropriate considerations and feedback to make decisions on an optimal route for the human transport device 106. In some embodiments, the route planning module 218 may make informed decisions regarding the use of lifts, conveyors, ramps, tunnels, and/or other conveyance equipment or features of the workspace 102 to facilitate movement of the human transport device 106 along a planned route.

Once a route is selected, the route planning module 218 may communicate the route to the selected human transport device 106 via the communication interface 202. The planning of routes by the route planning module 218 enables the coordination of the components of the inventory system 100 to move in a collision-free manner by having the human transport device 106 move along the planned route, whether the human transport device 106 is controlled/guided by an onboard control unit, or whether it is guided or steered by the user 114 onboard the human transport device 116. In this way, mobile drive units 104 can continue their daily operations of moving inventory holders 108 and other tasks assigned to them while the human transport devices 106 move in coordination with the routes planned for the mobile drive units 106 by the mobile drive unit manager 206. It is to be appreciated that the route planned by the route planning module 218 may include a departure route and a return route such that, when the user 114 completes a task, the human transport device 106 is instructed to return the user 114 via the return route to a drop-off location, which may or may not be the same location as the starting location where the user 114 boarded the human transport device 106. Additional conditions may be monitored by the human transport manager 208 before selected human transport devices 106 are authorized to embark on their task assignment, such as a condition that a door of the human transport device 106 is locked, indicating that the assigned user 114 has entered the human transport device 106. In this scenario, a handshake may occur between the management module 110 and the selected human transport device 106 to ensure that the condition of receiving confirmation of a door-lock of the human transport device 106 is met before the human transport device 106 is allowed to initiate the task assignment and move toward the destination location.

In some embodiments, the human transport devices 106 may themselves be responsible for some decision-making relating to certain aspects of their operation, thereby reducing the processing load on the management module 110. For example, the human transport devices 106 may be configured to manage a localized protected area by broadcasting a wireless signal to announce their "presence" within the workspace 102, and the mobile drive units 104 may be configured to detect and acknowledge the broadcast presence information to avoid collisions with the human transport devices 106 that are moving within the workspace 102.

In some embodiments, the human transport manager 208 further includes a protected area manager 220 to designate one or more areas within the workspace 102 as protected areas, such as the protected areas 122 shown in FIG. 1. The protected area manager 220 may prohibit unauthorized objects from entering the protected areas 122, while allowing a selected human transport device 106 to be within the protected areas 122 as an authorized human transport device 106. For example, when a task assignment 214 for maintenance of a failed drive unit 116 is issued to a selected human transport device 106, the protected area manager 220 may designate an area around the failed drive unit 106 in the vicinity of the failed drive unit 116 as the protected area 122, and would allow the selected human transport device 106 to enter, or otherwise be within, the protected area 122. If other, unauthorized human transport devices 106 or mobile drive units 104 are detected within the protected area 122, or the management module 110 receives a notification that any unauthorized object has entered the protected area 122, remedial action may be taken by the management module 110, which will be discussed further below.

In order to allow a human transport device 106 to traverse the active workspace 102 toward a destination location with minimal disruption to the continuing operation of the inventory system 100, the protected area 122 designated by the protected area manager 220 may initially be as small as possible until an authorized human transport device 106 arrives at the destination location. Making the protected area 122 as small as possible allows for maximized active workspace 102 around the protected area 122 in which the mobile drive units 104 may continue operations and/or movement. Accordingly, the protected area may be of any suitable shape, such as a square, rectangle, circle, triangle, or any polygonal shape suitable under the circumstances. The protected area manager 220 may designate an initial protected area 122 with a minimal radius or area dimension to create as small an area as possible. In some embodiments, the workspace 102 may be divided into segments or cells, and the protected area 122 may be designated as a number of cells around a location in the workspace 102.

In some embodiments, the protected area 122 may be designated around a destination location associated with a task assignment. Upon arrival of the selected human transport device 106 with the user 114 at the destination location, the protected area 122 may be re-defined so that it is enlarged or reduced in size so that the human transport device 106 and/or the user 114 may maneuver within the protected area 122 as needed. In some embodiments, the protected area manager 220 may be configured to enlarge the protected area 122 a certain amount or degree, or the user 114 may request an amount by which the protected area 122 is to be enlarged via their associated computing device or an interface onboard the human transport device 106. As such, the user 114 may have the option of enlarging the protected area 122 to provide the requisite space needed for them to work within the protected area 122.

In some embodiments, the protected area manager 220 may be preconfigured with incremental sizes for the protected area 122 associated with particular demands or scenarios, such as an initial containment size of a smallest area, an assessment size of an incrementally larger area for the user 114 to assess the situation at the destination location, and a work size of a largest area to allow for ample space within which the user 114 can work safely. In yet other embodiments, the protected area 122 may dynamically expand if it is detected that the current location of the human transport device 106 or the user 114 moves outside of the protected area 122.

In some embodiments, the protected area manager 220 may designate a protected area around, and within the vicinity of, the human transport device 116 that dynamically moves with the human transport device 106 as it traverses the workspace 102. Although the route planning module 218 may suffice to plan routes for the human transport device 106 in a collision-free manner, a dynamically movable protected area around the human transport device 106 may be provided for enhanced safety of the user 114 being transported by the human transport device 106. In such scenarios, if an object moves within the protected area around the human transport device 106, remedial action may be taken, such as disabling the encroaching object, if possible, rerouting the human transport device 106, or shutting down all, or at least a portion of, the workspace 102 and any components moving within the workspace 102.

The human transport manager 208 may further include an alarm module 222 to receive alerts or notifications related to the management of the one or more protected areas 122 designated by the protected area manager 220. For example, the alarm module 222 may receive notification of a current location of the human transport device 106 or the user 114 and may take remedial action if the human transport device 106 and/or the user 114 are detected outside of the protected area 122, such as an entire workspace 102 shutdown as a failsafe measure. As another example, if it is detected that the protected area 122 has been encroached upon, such as when an unauthorized object is detected to have entered the protected area 122, an alert may be sent to the alarm module 222 to generate an alert condition where remedial action may be taken (e.g., entire shutdown of the workspace 102). Various mechanisms for sensing and reporting this information will be described in further detail below.

The management module 110 may further include one or more input/output devices 224, such as a display (e.g., touchscreen display) configured to enable a graphical user interface (GUI) for user interaction with the functionality of the management module 110. For example, a human operator may make modifications to resources (e.g., human transport devices 106), planned routes, and/or task assignments 214, and may manage protected areas 122 via the input/output device(s) 224.

Other Example Architectures

Figure 3:
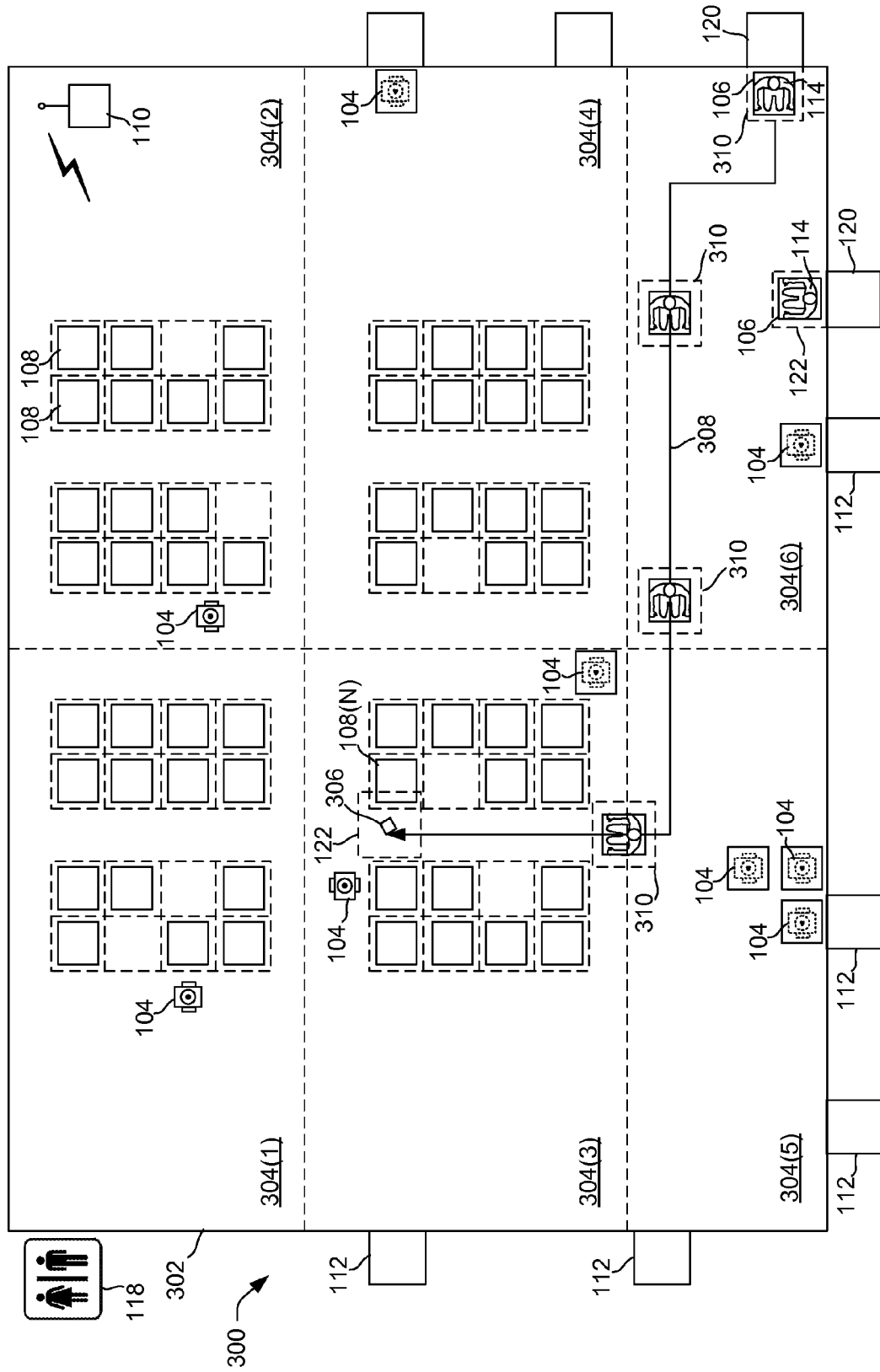
FIG. 3 illustrates an example inventory system according to another embodiment including a workspace having multiple zones that may be independently activated or deactivated.

FIG. 3 illustrates an example inventory system 300 according to another embodiment including a workspace 302 having multiple zones 304(1), 304(2), 304(3), 304(4), 304(5), and 304(6). Although six zones 304(1)-(6) are shown in FIG. 3, it is to be appreciated that the workspace 302 may be partitioned into any number of zones greater or fewer than six zones. In some embodiments, the zones 304(1)-(6) may be independently and virtually activated or deactivated as a failsafe feature, and may essentially represent an enlarged protected area 122 where unauthorized objects are prohibited and only authorized human transport devices 106 may be allowed to enter the deactivated zones. The zones 304(1)-(6) may be designated in any suitable manner such as a number of cells, blocks or segments of a partitioned workspace 302, areas between known physical structures such as pillars, or any suitable designation. In addition, the zones 304(1)-(6) may overlap, and they may be substantially equal in size or they may be of different shapes (e.g., rectangular, circular, or any suitable geometric shape), sizes or dimensions depending on the circumstances and/or layout of the workspace 302.

FIG. 3 further illustrates a scenario where a fallen inventory item 306 has been detected within the workspace 302. The fallen inventory item 306 is an obstruction within the workspace 102 and may cause problems for normal operations to continue within the workspace 302. An alert 212 may be transmitted to the management module 110 upon detection of the fallen inventory item 306 such that a task assignment may be generated for a user 114 to be transported to a destination location of the fallen inventory item 306 and to clear the workspace 102 of the fallen inventory item 306. As described above, a protected area 122 may be designated by the protected area manager 220 in an area surrounding the fallen inventory item 306. The protected area 122 may initially be designated as small as possible.

FIG. 3 also shows that an inventory holder 108(N) is located within the protected area 122. In this scenario, the mobile drive unit manager 206 may instruct a mobile drive unit 104 to remove the inventory holder 108(N) in order to clear the protected area 122 for the user 114 assigned to the task of inventory item cleanup. In a similar fashion, any movable, or portable, object that is located within the protected area 122 may be moved via instruction from the management module 110. Upon arrival of the selected human transport device 106 and user 114 at the destination location of the fallen inventory item 306, if the user 114 desires to disembark the human transport device 106, the management module 110 may deactivate zone 304(3) to provide more safety for the user 114 who is now outside of the human transport device 106.

In another embodiment, the management module 110 may identify "possible" zones that the selected human transport device 106 and/or user 114 may traverse through, or be situated within, at any given time, such as zones 304(3), 304(5) and 304(6) that are each traversed in some way or another by a route 308 of the selected human transport device 106. Additionally, an "expected" zone where the human transport device 106 is expected to be (e.g., zone 304(3)) may be identified by the management module 110. All other zones (e.g., zones 304(1), 304(2) and 304(4)) may be identified as "unexpected" zones. Accordingly, the management module 110, upon receiving notification that the selected human transport device 106 or the user 114 is currently within an unexpected zone, may take remedial action, such as shutting down the entire workspace 302. This provides safety for the users 114 that might be within the workspace 302 at any given time.

FIG. 3 also illustrates a dynamically movable protected area 310 that moves with the human transport device 106 as it traverses the workspace 302 when travelling to or from a destination location, as briefly described above. This dynamically movable protected area 310 may be designated and managed by the protected area manager 220. In some embodiments, the protected area manager 220 may receive periodic information about a current location of the human transport device 106 via communication from the human transport device 106 itself or other sensors within the workspace 302 that are configured to detect current location data of human transport devices 106. In addition, or alternatively, the human transport device 106 may designate its own localized protected area 310 by broadcasting a wireless "presence" signal configured to notify, and possibly disable, other moving components of the inventory system 300. The dynamically movable protected area 310 may be designated in lieu of, or in addition to, any of the fixed protected areas 122 that do not move with the human transport device 106.

Example Human Transport Devices

Figure 4A:
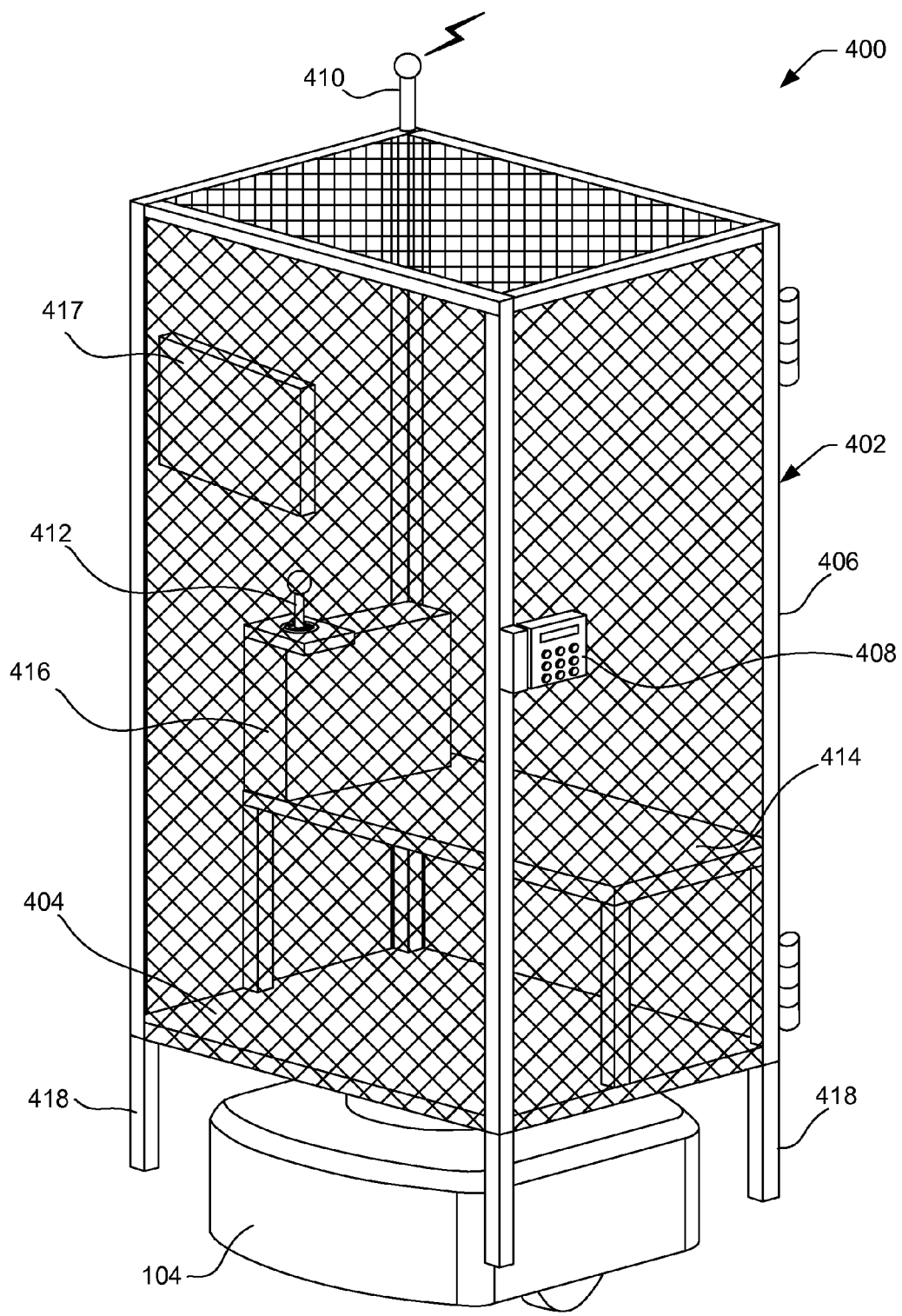
FIG. 4A illustrates an example human transport device that may be implemented as part of the inventory systems of FIGS. 1 and 3.
Figure 4B:
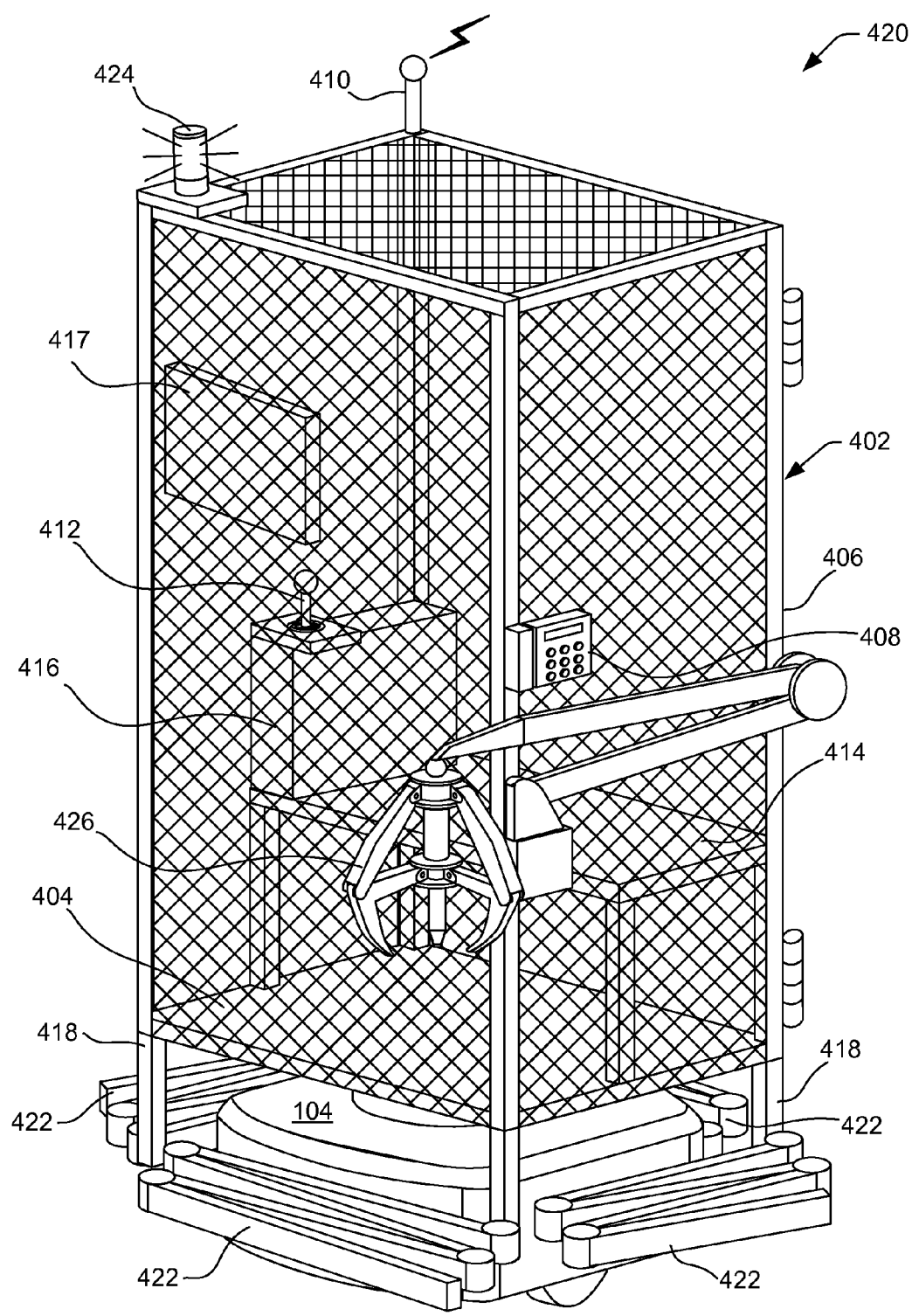
FIG. 4B illustrates an example human transport device according to another embodiment that may be implemented as part of the inventory systems of FIGS. 1 and 3.

FIGS. 4A and 4B illustrate example human transport devices that may be implemented as part of the inventory system 100 and 300 of FIGS. 1 and 3, respectively, according to various embodiments. In general, the human transport devices disclosed herein may represent any devices or components suitable for transporting personnel/users 114 within the workspace 102, 302 of the inventory system 100, 300. In some embodiments, the human transport devices of the embodiments disclosed herein represent single, integrated units with permanent, onboard drive subsystems to power the human transport devices. In other embodiments, the human transport devices are comprised of detachable components that interoperate to make up the human transport device. FIG. 4A illustrates one example embodiment of such a human transport device 400 comprised generally of detachable components including a portable cabin 402 that is configured to be lifted or otherwise docked with a mobile drive unit 104.

FIG. 4A shows the portable cabin 402 in a lifted state and supported by the mobile drive unit 104 such that the portable cabin 402 may be transported from one location to another by the power of the mobile drive unit 104. Although FIG. 4A shows the mobile drive unit 104 lifting the portable cabin 402 from underneath the portable cabin 402, it is to be appreciated that the mobile drive unit 104 may connect to, or otherwise interact with, the portable cabin 402 in any suitable manner so that, when docked, the mobile drive unit 104 is coupled to the portable cabin 402 and can move the portable cabin 402 within the workspace 102, 302. For instance, in some embodiments a hitch facilitating attachment of the mobile drive unit 104 to the portable cabin 402 may enable the mobile drive unit 104 to push/pull the portable cabin 402, wherein the portable cabin 402 may include casters or a similar wheel-like mechanism at the bottom of the portable cabin 402 for such movement. The mobile drive unit 104 may comprise suitable components to lift, rotate and/or otherwise maneuver the portable cabin 402 into any position, location and/or orientation. The mobile drive unit 104 (or the drive subsystem in the fully integrated embodiment of the human transport device 106) may include motorized wheels or legs configured to propel and/or rotate the human transport device 400 in any direction and at various speeds and accelerations. In some embodiments, a self-powered human transport device 106 (i.e., without a detachable mobile drive unit 104) may include wheels or legs configured to allow for translational movement of the human transport device 106.

In some embodiments, the human transport devices 106, 400 represent independent, self-powered devices configured to freely move about the workspace 102, 302. In other embodiments, the human transport device 106, 400 represent elements of a tracked inventory system 100, 300 configured to be moved along tracks, rails, cables, crane system, or other guidance or support elements traversing the workspace 102, 302. In such an embodiment, the human transport devices 106, 400 may receive power and/or support through a connection to the guidance elements, such as a powered rail.

Referring again to the human transport device 400 shown in FIG. 4A, the portable cabin 402 may comprise a platform 404 to support a user 114 thereon, and an enclosure 406 that is coupled to the platform, such as by any attachment means including fasteners (e.g., bolts, screws, etc.), welding, latches, or any suitable permanent or releasable attachment means. The enclosure 406 is configured to surround the user 114 when the user 114 is situated within the enclosure 406 and on top of the platform 404. The enclosure 406 may comprise a cage-like structure configured to substantially prevent the user 114 from sticking an appendage through the enclosure 406, such as an arm or leg of the user 114. Any suitable material may be used for the enclosure 406, such as metal, acrylic glass (i.e., Plexiglas®), and/or plastic. The portable cabin 402 is shown to be generally rectangular in shape, but it can be of any suitable shape, such as cylindrical, spherical, or an irregular shape suitable for housing a human user 114 therein.

In some embodiments, the human transport device 400 may include a lock 408 or latch that allows a door of the human transport device 400 to open when unlocked or to remain closed when locked. The lock 408 may include a keypad, touch screen, card reader (e.g., magnetic stripe reader, wireless proximity reader, etc.), any combination thereof, or any other suitable input means to authenticate a user and/or receive a user identification (ID) and/or a universal access code that allows the user 114 to unlock the lock 408 in order to enter/exit the human transport device 400.

In addition to providing access to the human transport device 400, the lock 408 may enable a determination to be made as to whether a user 114 has entered the human transport device 400. For example, the human transport device 400 may have been selected for a particular task assignment 214 involving a user 114. Before moving to the destination location associated with the particular task assignment 214, the human transport device 400 may be programmed to confirm that the user 114 assigned to the task assignment 214 has entered the human transport device 400. This may be accomplished by the user 114 entering a user ID via the keypad of the lock 408, issuing an audible voice command, swiping or otherwise presenting a card that contains the user ID or information related thereto, and the like. As such, the human transport device 400 may acknowledge that the user 114 has opened the door of the human transport device 400 and entered the human transport device 400 before embarking on the task assignment 214 to the destination location. Accordingly, in some embodiments, weight or load sensors may also be included in the human transport device 400, such as under the platform 404, to determine that a user 114 is in fact inside the human transport device 400 and on the platform 404.

Additionally, the human transport device 400 may be capable of communicating with the management module 110 via a transceiver 410 to receive information related to task assignments 214, to transmit a current location, current conditions, or other components of the inventory system 100, 300 with which they are interacting at periodic intervals or when requested/polled by the management module 110, or to exchange any other suitable information to be used by the management module 110 or the human transport device 400 during operation. The transceiver 410 may allow for communication with the management module 110 wirelessly, as shown in FIG. 4A, or it may enable the use of wired connections between the human transport device 400 and the management module 110. As one illustrative example, the transceiver 410 may communicate with the management module 110 and/or with other components of the inventory system 100, 300 using 802.11, Bluetooth®, IrDA standards, or any other appropriate wireless communication protocol. As another example, in a tracked system, the tracks or other guidance elements upon which the human transport devices 400 move may be wired to facilitate communication between the human transport devices 400 and other components of the inventory system 100, 300.

In some embodiments, the transceiver 410 may enable broadcasting of the aforementioned "presence" signal as one example mechanism for the human transport device 400 to manage a localized protected area that moves with the human transport device 400, such as the protected area 310 of FIG. 3. The wireless signal may be any suitable type of signal, such as ultrasonic, Bluetooth®, or other type of short-range wireless signal.

In some embodiments, a joystick 412 or other type of driving control mechanism may be included in the human transport device 400 to allow a user 114 to override the drive subsystem, such as the mobile drive unit 104, and associated control unit and to manually control the movement of the human transport device 104. Generally, this type of control would be used in emergency situations where the user 114 needed to manually override the system to get to a particular location. Nonetheless, driving control may be provided for the user 114 being transported by the human transport device 400. The user 114 may stand or sit within the enclosure 406 of the human transport device, and as such, a seat 414 may be provided for the user 114 to sit upon.

Other safety mechanisms may be provided with the human transport device 400 including, but not limited to, restraints, a roll cage, airbags, etc., to reduce the risk that the user 114 is injured while being transported by the human transport device 400. In some embodiments, an armrest 416 may double as a storage compartment for tools that the user 114 may access for completion of task assignments 214. For example, service tools specifically configured for maintenance of equipment or mobile drive units 104 may be stored in the armrest 416 or in another suitable location in/on the human transport device 400. Other more general tools such as screw drivers, wrenches, electrical test equipment, flashlights, etc., may be stored inside the armrest 416 as well so that the tools therein may be accessed at any time by the user 114. Other storage areas may be provided in addition, or as an alternative, to the armrest 416, such as below the seat 414, on the platform 404, or any suitable location. In some embodiments, the armrest 416 may include a fold-out table that can be deployed to allow the user 114 to set a laptop or other object(s) upon the table.

In some embodiments, the human transport device 400 further includes an output device 417, such as a monitor or heads-up display, allowing for output of information to the user 114, such as task assignment information, planned routes, current location of the human transport device 400 or other active mobile drive units 104, and other suitable information that may be of use to the user 114. In some embodiments, the output device 417 may be configured to provide a user interface (UI) allowing the user 114 to provide inputs to a UI.

In the configuration of FIG. 4A, when the mobile drive unit 104 decouples from the portable cabin 402 of the human transport device 400, it may lower the portable cabin 402 until uprights 418, or posts, that extend downward from the bottom of the platform 404 rest upon the ground to support the portable cabin 402 in a "parked" state. This allows any of the mobile drive units 104 to act as a drive subsystem of the human transport device 400.

FIG. 4B illustrates an example human transport device 420 according to another embodiment. The human transport device 420 may also be implemented as part of the inventory system 100, 300 of FIGS. 1 and 3, respectively. Many of the same, or similar elements and features are included in the human transport device 420 as were shown and described with reference to the human transport device 400 of FIG. 4A, and accordingly, the explanation of FIG. 4A may be referenced for similar reference numerals between FIGS. 4A and 4B.

The human transport device 420 of FIG. 4B may further include an extendable physical barrier 422 to surround the human transport device 420 in an extended configuration, shown in FIG. 6B, below. The extendable physical barrier 422 is shown as being comprised of four extendable/retractable arms attached to respective ones of the four uprights 418, each extendable/retractable arm being configured to collapse in an accordion-style folded configuration and to extend to create part of the extendable physical barrier 422. The extendable physical barrier 422 may act as a reinforcement mechanism to provide greater safety to a user 114 when the user 114 is within the workspace 102, 302. For example, upon arriving at a destination location to complete a task assignment 214, the user 114 may need to exit the human transport device 420 in order to perform a task outside of the human transport device 420 (e.g., fixing a disabled drive unit 116). Upon exiting or disembarking the human transport device 420, the user 114 may manually extend the extendable physical barrier 422 to surround the human transport device 420 so that the user 114 has an area that physically stops objects from encroaching the work area of the user 114. The extendable physical barrier 422 may be extended to substantially coincide with the boundary of the protected area 122 designated by the protected area manager 220, or it may be within or outside of the boundary of the protected area 122. In some embodiments, the extendable physical barrier 422 may be automatically extended/retracted, such as with an electric motor, so that the user 114 does not have to manually operate the extendable physical barrier 422.

The human transport device 420 may further include a light 424, such as a light emitting diode (LED), headlight, or similar light emitting element to provide light in the vicinity of the human transport device 420. The light 424 may aid the user 114 in completing the task assignment 214 in a dimly lit, or dark, workspace 102, 302. The light 424 may further provide notification to surrounding users 114 or components of the inventory system 100, 300 that a user 114 is within the workspace 102, 302. In some embodiments, the light 424 comprises a spotlight to project an area of light onto a floor of the workspace 102, 302. The illuminated area of the workspace 102, 302 may coincide with the protected area 122 designated by the protected area manager 220, or it may be a different area within the workspace 102, 302.

In some embodiments, the human transport device 420 further includes a crane 426 or claw mechanism that is configured to be manipulated and controlled by the user 114 inside the enclosure 406 via the joystick 412 or an additional control mechanism. The crane 426 may allow the user 114 to pick up an object within the workspace 102, 302 without having to exit the human transport device 420. This may be useful in situations where a small inventory item needs to be picked up, for example, and it may be more efficient for the user 114 to remain within the enclosure 406 of the human transport device 420 and to have the crane 426 pick up the inventory item.

Figure 5:
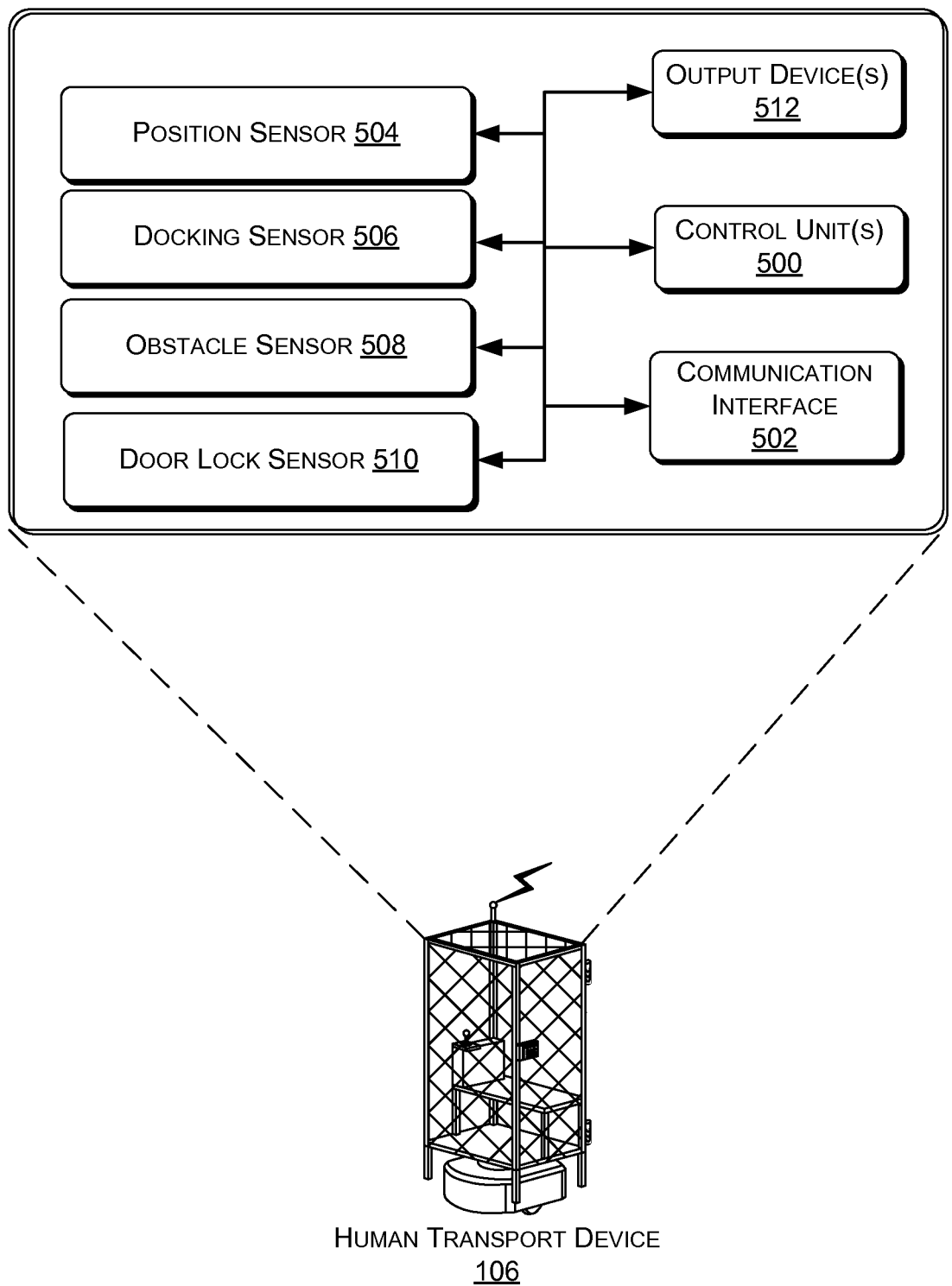
FIG. 5 illustrates in greater detail an example human transport device and the components therein that may be implemented as part of the inventory systems of FIGS. 1 and 3.

FIG. 5 illustrates in greater detail an example human transport device, such as the human transport device 106 of FIGS. 1 and 3, and the components of the human transport device that may be implemented as part of the inventory system 100, 300 of FIGS. 1 and 3, respectively. Particularly, the human transport device 106 may include one or more control units 500, a communication interface 502, and one or more sensors, such as a position sensor 504, a docking sensor 506, an obstacle sensor 508, and a door lock sensor 510. It is to be appreciated that various embodiments and reference numerals have been used to describe and reference the human transport devices disclosed herein. Any reference to a specific numeral should not so limit the configuration of the human transport device that may be implemented with the inventory system 100, 300, and any reference in the claims can be any of the aforementioned human transport devices 106, 400 or 420.

In FIG. 5, the control unit(s) 500 may be configured to control the movement of the human transport device 106 in coordination with the active mobile drive units 104 moving within the workspace 102, 302. For example, the human transport device 106 may receive a planned route from the management module 110 via the communication interface 502, and the control unit 500 may thereby control the movement of the human transport device 106 such that it follows the route received from the management module 110. The control unit 500 may receive information from the sensors 504-510 and adjust the operation of the human transport device 106 based on this information. The control unit(s) 500 may be comprised of any suitable hardware and/or software, and may include a general-purpose microprocessor programmed to provide the desired functionality to the human transport device 106.

In some embodiments, the control unit 500 is configured to control the communication interface 502 to broadcast the aforementioned "presence" signal. This presence signal may enable the human transport device 106 to manage a localized protected area, such as the protected area 310 shown in FIG. 3, such that mobile drive units 104 and/or other components of the inventory system 100, 300 that detect the broadcast of the presence signal by the human transport device 106 may navigate around the protected area 310 or otherwise be disabled if they enter the protected area 310.

The position sensor 504 may provide navigation capabilities for the human transport device 106, such as by determining the location of the human transport device 106 within the workspace 102, 302. For example, the position sensor 504 may be a camera or other suitable image and/or video processing component configured to detect visual or fiducial marks that are indicative of a coordinate position within the workspace 102, 302. As another example, the position sensor 504 may be a global positioning system (GPS) receiver configured to determine a location of the human transport device 106 by utilizing a network of orbiting satellites, and based on distance measurements from the satellites and triangulation computations, a current location may be determined. The current location may be transmitted to the management module 110 as requested (e.g., the management module polls the human transport device) and/or periodically by the communication interface 502.

The docking sensor 506 may be utilized in human transport devices such as the human transport device 400, 420 of FIGS. 4A and 4B where a mobile drive unit 104 docks with the portable cabin 402 in order to propel the human transport device 400, 420. Accordingly, the docking sensor 506 may determine an absolute location of the portable cabin 402, or a location of the portable cabin 402 relative to the mobile drive unit 104 such that the mobile drive unit 104 may use this information for docking with the portable cabin 402.

The obstacle sensor 508 may detect objects located in one or more different directions in which the human transport device 106 is capable of moving. The obstacle sensor 508 may utilize any appropriate technique for detecting objects within the workspace 102, 302, such as optical, radar, sonar, pressure-sensing and/or other types of detection mechanisms. Detected objects may be transmitted to the management module 110 via the communication interface 502. This information may be particularly useful for maneuvering the human transport device 106 in a collision free manner about the workspace 102, 302.

The door lock sensor 510 may be configured to detect whether a door of the enclosure 406 is in a locked state by the lock 408 on the human transport device 400. If the door lock sensor 510 detects that the door is locked, such information may be sent to the management module 110 via the communication interface 502 to facilitate a handshake required for movement of the human transport device 400. In some embodiments, the door lock sensor 510 may be configured to provide a local signal to the control unit(s) 500 for control of the human transport device 106, 400 such as if movement of the human transport device 106, 400 is conditioned upon detecting the door in a locked state via the door lock sensor 510.

The human transport device 106 may further comprise one or more output devices 512, such as a display, speaker, printer, etc. For example, the output device 512 may comprise a monitor or heads-up display such as the display described with reference to FIGS. 4A and 4B. The output device(s) 512 may provide input functionality as well, such as when the output device(s) 512 is a touch screen display configured to receive user input from a user 114.

Example Failsafe Mechanisms

Figure 6A:
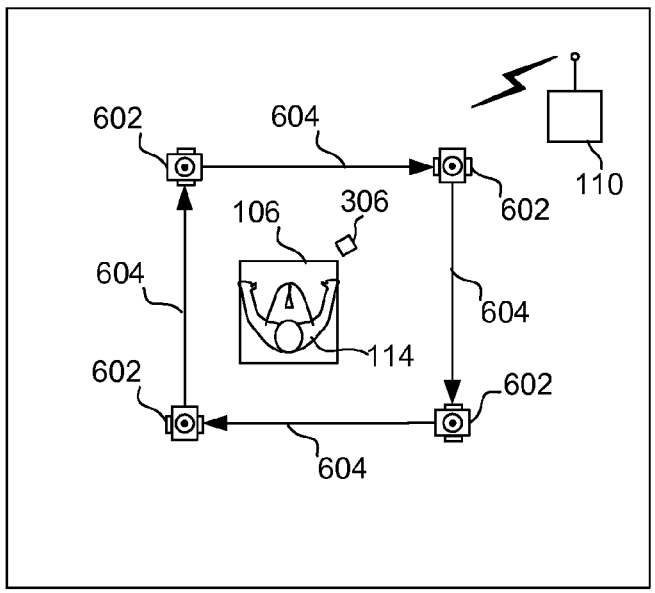
FIG. 6A illustrates an example system to transport a user within a workspace, the system including a plurality of sentinel drive units positioned at a perimeter of a protected area in proximity to a human transport device.
Figure 6B:
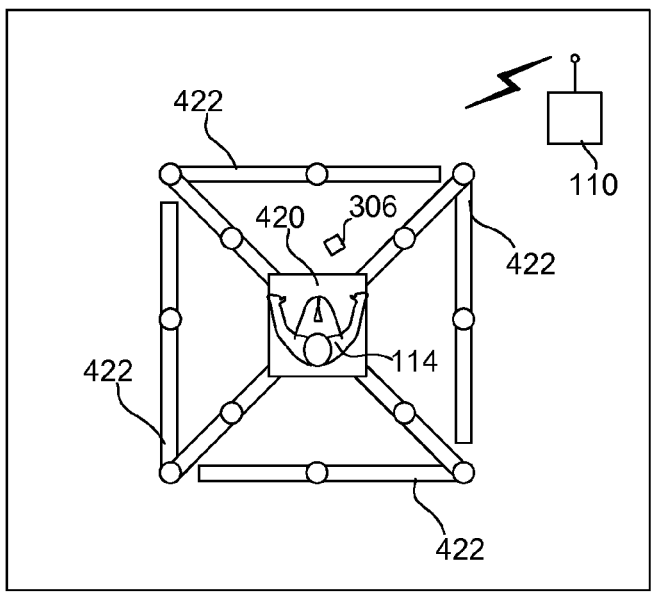
FIG. 6B illustrates the human transport device of FIG. 4B implemented in an example system to transport a user within a workspace showing the extendable physical barrier surrounding the human transport device.

FIGS. 6A and 6B illustrate example embodiments of the human transport device 106 used in a system with failsafe mechanisms and features. FIG. 6A shows a human transport device, such as the human transport device 106 of FIGS. 1 and 3, that has transported a user 114 to a destination location where a fallen inventory item 306 is located. System 600 may include multiple sentinel drive units 602, or sentinel bots, configured to be positioned at or near a perimeter of a protected area, such as the protected area 122 of FIGS. 1 and 3. The sentinel bots 602 represent mobile drive units that are preferably small, cheap and configured for the specific purpose of watching for encroachment of unauthorized objects within the protected area 122.

The sentinel bots 602 may be configured to project one or more light beams 604 toward an adjacent sentinel bot 602 in order to create a light curtain to detect the unauthorized objects that may enter the protected area 122. Accordingly, each sentinel bot 602 may also be configured to receive and detect the projected light beam(s) 604 of an adjacent sentinel bot 602. Detection of encroachment on the protected area 122 may be enabled by detecting a break or absence of light that is expected to be received by any adjacent sentinel bot 602. Although four sentinel bots 602 are shown in FIG. 6A, it is to be appreciated that more or fewer sentinel bots 602 may be utilized in the system 600 without changing the basic characteristics of the system 600, and the sentinel bots may be arranged in any perimeter configuration, such as at the corners of any polygonal shape, on a circle of a defined radius, etc. Other detection mechanisms may be utilized by the sentinel bots 602 as well, such as passive optical detectors (e.g., cameras), sonar, a physical trip-line, etc.

In some embodiments, a human transport device such as the human transport devices 400 and 420 of FIGS. 4A and 4B may be utilized in the system 600 and the mobile drive unit 104 that drives the portable cabin 402 of the human transport device 400, 420 may be programmed to drop the portable cabin 402 at the destination location and move to a location in proximity to the portable cabin 402 with the sentinel bots 602 to act as a sentinel bot 602 itself. In such a scenario, the mobile drive unit 104 of the human transport device 400, 420 may also be configured to project one or more light beams toward an adjacent sentinel bot 602, and to sense light beams projected from an adjacent sentinel bot 602.

FIG. 6B shows a human transport device, such as the human transport device 420 of FIG. 4B, that has transported a user 114 to a destination location where a fallen inventory item 306 is located. Particularly, system 606 shows the human transport device 420 including the extendable physical barrier 422 in an extended configuration. The physical barrier 422 may provide a failsafe safety mechanism for the user 114 if the user, for example, needs to disembark or otherwise exit the human transport device 420 for any reason, such as to complete the task assignment 214.

In yet other embodiments, the inventory system 100, 300 may further include one or more "rescue" drive units, or rescue bots, configured to go within the workspace when a human transport device 106 carrying a user 114 breaks down or is otherwise rendered immobile. The rescue bot could be configured similarly to the human transport devices described herein such that the rescue bot may transport users 114 between locations within the workspace 102, 302. The rescue bot may be able to dock with a disabled human transport device and allow the user 114 to exit the disabled human transport device and enter the rescue bot while within the workspace 102, 302 so that they may be transported out of the active workspace 102, 302 by the rescue bot.

Additional failsafe mechanisms may be provided in the inventory system 100, 300. For instance, the lock 408 included on the human transport device 400, 420 may be configured to detect events such as the door of the human transport device 400, 420 being opened unexpectedly. Accordingly, the lock 408 may send a signal to the transceiver 410 that alerts the alarm module 222 of the management module 110 in order to take remedial action, such as shutting down all or a portion of the workspace 102, 302 so that additional safety may be provided to the user 114 who may exit the human transport device 400, 420 in an active workspace. In some embodiments, the lock 408 may remain locked until it determines that no mobile drive units 104 are within the protected area 122, 310, and if a mobile drive unit 104 is detected within the protected area 122, 310, the lock 408 may require a handshake to determine that the mobile drive units 104 within the protected area 122, 310 are stopped before the lock 408 disengages to allow the user 114 to exit the human transport device 400, 420. Manual overrides may be provided for emergency situations where the user 114 must exit regardless of a handshake or not.

In some embodiments, the human transport device 400, 420 and/or a computing device associated with the user 114 may include a physical or virtual tether that monitors a distance the user 114 is from the human transport device 400, 420 and/or the protected area 122, 310. For instance, the tether may be a physical cord that is attached to the user 114, and when the user 114 moves beyond a threshold distance from the human transport device 400, 420 thereby breaking the tether, an alert may be generated and transmitted to the alarm module 222 of the management module 110 to take remedial action, such as shutting down all or a portion of the workspace 102, 302. Other types of virtual tethers may be implemented with the human transport device 400, 420 such as range detectors based on any suitable technology such as radio-frequency identification (RFID), optical, ultrasonic, radar, GPS, etc., in order to detect when the user 114 moves beyond a threshold distance from the human transport device 400, 420 to take remedial action.

Example Processes

Figure 7:
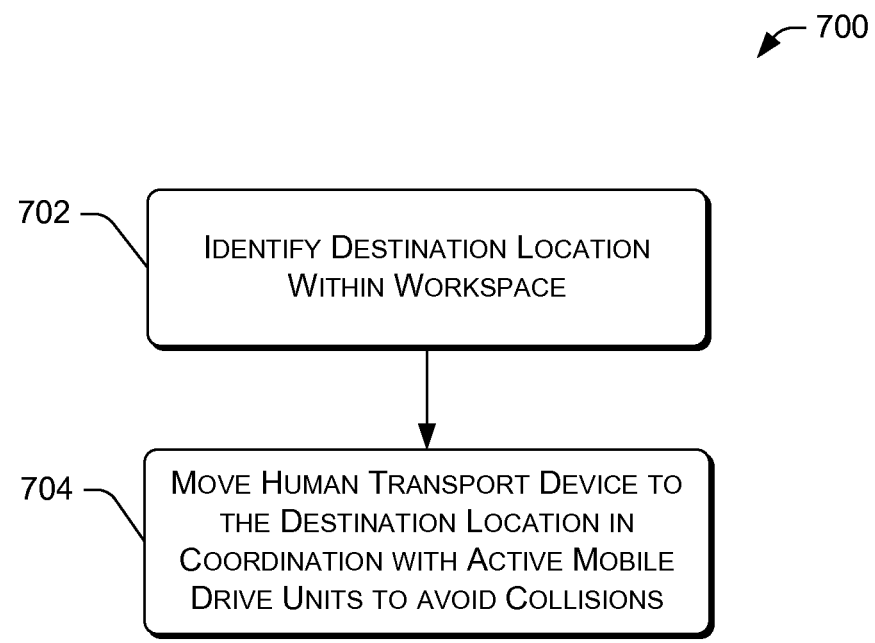
FIG. 7 is a flow diagram of an illustrative process for transporting a user within a workspace using a human transport device.
Figure 8:
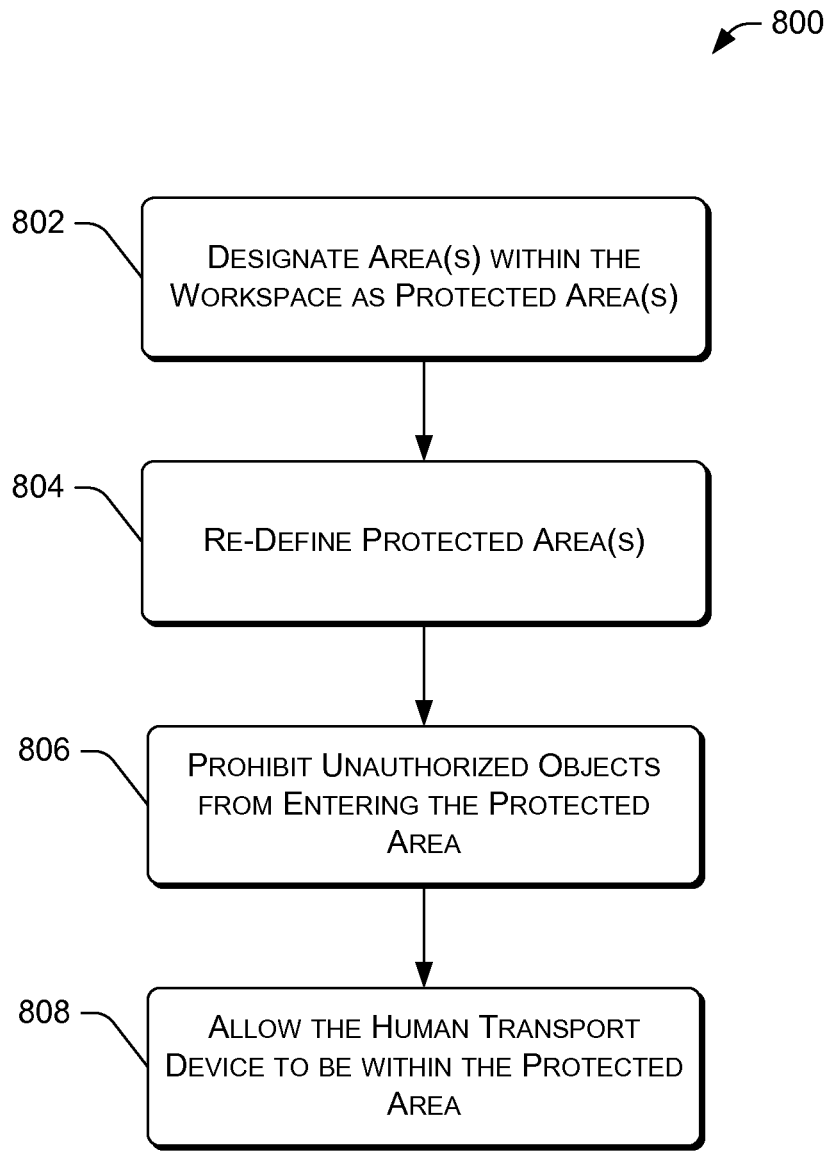
FIG. 8 is a flow diagram of an illustrative process for designating and managing one or more protected areas within the workspace.

FIGS. 7 and 8 are flow diagrams of an illustrative process for implementing the invention. The processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 7 is a flow diagram of an illustrative process 700 for transporting a user 114 within a workspace 102, 302 using a human transport device, such as the human transport device 106 of FIGS. 1 and 3.

For discussion purposes, the process 700 is described with reference to the architectures 100 and 300 of FIGS. 1 and 3, as well as the block diagram of FIG. 2, and specifically with reference to the route planning module 218 of the human transport manager 208.

At 702, the human transport manager 208 may identify a destination location within a workspace. The destination location may be associated with a task assignment 214 such as the location of a failed drive unit 116, a fallen inventory item 306, or a location within the workspace 102, 302 that is near a bathroom 118 or other point of interest outside of the workspace 102, 302.

At 704, a human transport device 106 may be moved to the destination location identified in 702. The movement of the human transport device 106 may be directly controlled by the control unit 500 of the human transport device 106 which received a route from the route planning module 218 such that by following this route, the human transport device 106 may traverse the workspace 102, 302 in a collision-free manner and in coordination with the active mobile drive units 104 in the workspace 102, 302. In so doing, the human transport device 106 carries a user 114 therein to be transported to the destination location for completion of the task assignment 214. In other embodiments wherein the human transport device 106 is guided or steered by the user 114 within the human transport device 106, the user 114 may control movement of the human transport device 106 along the route received from the route planning module 218, and the management module 110 and the active mobile drive units 104 within the workspace 102, 302 are configured to control movement of other components, such as the mobile drive units 104, of the inventory system 100, 300 in relation to the planned route for the human transport device 106 such that collisions are avoided even though movement of the human transport device 106 may be directly under control of the user 114.

FIG. 8 is a flow diagram of an illustrative process 800 for designating and managing protected areas, such as the protected areas 122 and/or 310 of the inventory systems 100, 300.

For discussion purposes, the process 800 is described with reference to the architectures 100 and 300 of FIGS. 1 and 3, as well as the block diagram of FIG. 2, and specifically with reference to the protected area manager 220.

At 802, the protected area manager 220 designates one or more areas within the workspace 102, 302 as protected areas. In some embodiments, the protected area 122 surrounds a destination location associated with a task assignment 214 in the vicinity of the destination location. In some embodiments, as described above, the protected area may be a dynamically movable protected area 310, which may move with the human transport device 106 as it traverses the workspace 302.

The protected area designated at 802 may initially be as small as possible to minimize the impact on the production of the inventory system 100, 300. At 804, the protected area manager 220 may re-define the protected area 122, such as by enlarging or reducing the size of the protected area 122 automatically or manually, such as when the human transport device 106 arrives at the destination location. In some embodiments, the re-defining at 804 may include re-defining the location and/or the shape of the protected area, such as changing the shape from a rectangle to a circle.

At 806, unauthorized objects may prohibited from entering or otherwise being within the protected area 122, 310. As described in detail above, this may be enabled by current location detection and notification of the various components of the inventory system 100, 300 and management of this information by the management module 110. Additionally, or alternatively, other means of detecting unauthorized object encroachment may be enabled with sentinel bots 602 or other sensors onboard the human transport device 106, such as the obstacle sensor 508. The inventory system 100, 300 itself may utilize sensors (e.g., cameras) located throughout the workspace 102, 302 to detect location and encroachment of unauthorized objects within designated protected areas.

At 808, the protected area manager 220 allows the selected human transport device 106 to be within the protected area 122, 310. The selected human transport device 106 may be identified by a unique identifier and a current location of the human transport device 106 and the identifier may be transmitted to the management module 110, perhaps periodically, so that the protected area manager 220 can monitor the location of the selected human transport device 106.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An inventory-handling system to transport a user within a workspace of the inventory-handling system, the inventory-handling system comprising:
    a first device to transport users within the workspace;
    a second device to transport the users within the workspace; and
    a management module to:
        receive a first request relating to a first task to be completed by a user;
        receive a second request relating to a second task to be completed by a qualified user;
        prioritize the first request and the second request based at least in part on an availability of qualified users capable of handling the second task;
        generate a first task assignment corresponding to the first request;
        generate a second task assignment corresponding to the second request, wherein the first task assignment and the second task assignment are to be completed according to a prioritization of the first request and the second request;
        transmit the first task assignment to the first device;
        transmit the second task assignment to the second device;
        direct movement of the first device with the user therein to a first destination location within the workspace along a first route; and
        direct movement of the second device with the qualified user therein to a second destination location within the workspace along a second route, wherein the first route and the second route are planned in relation to known routes of one or more active drive units within the workspace to avoid collisions between the first device, the second device, and the one or more active drive units within the workspace.

2. The inventory-handling system as recited in claim 1, wherein at least one device of the first device or the second device comprises a user identification (ID) component to receive a user ID of an associated user of the at least one device, the at least one device being further configured to determine, based at least in part on receiving the user ID, that the associated user has entered the at least one device before transporting the associated user to the first destination location or the second destination location.

3. The inventory-handling system as recited in claim 1, wherein at least one device of the first device or the second device comprises an extendable physical barrier to at least partially surround the at least one device when the extendable physical barrier is extended from a collapsed state where the extendable physical barrier is relatively closer to the at least one device to an extended state where the extendable physical barrier is relatively further away from the at least one device such that the extendable physical barrier defines an area around the at least one device when in the extended state.

4. The inventory-handling system as recited in claim 1, further comprising a protected area manager to:
    designate an area around at least one of the first destination location or the second destination location as a protected area;
    receive an indication that an unauthorized object has entered the protected area; and
    take remedial action in response to receiving the indication.

5. The inventory-handling system as recited in claim 4, further comprising a plurality of sentinel drive units configured to be positioned at a perimeter of the protected area and to detect unauthorized objects that enter the protected area.

6. The inventory-handling system as recited in claim 5, wherein each sentinel drive unit is configured to project a light beam toward another sentinel drive unit to detect the unauthorized objects that enter the protected area.

7. The inventory-handling system as recited in claim 4, wherein the management module is further configured to:
    determine that a portable object is within the protected area; and
    direct a drive unit to clear the portable object from the protected area before arrival of the first device or the second device at the at least one destination location of the first destination location or the second destination location.

8. The inventory-handling system as recited in claim 1, wherein at least one device of the first device or the second device comprises:
- a portable cabin having a platform to support an associated user of the at least one device and an enclosure to at least partially surround the associated user during movement of the at least one device; and
- a drive unit sized to be positioned underneath the platform and to dock with the portable cabin from underneath the platform, lift the portable cabin, and power the at least one device for movement.

9. The inventory-handling system as recited in claim 1, wherein at least one device of the first device or the second device comprises a tether to determine whether a distance between the at least one device and an associated user of the at least one device exceeds a threshold distance, and wherein the management module is further configured to receive a notification from the at least one device that the associated user is beyond the threshold distance based on the tether, and to take remedial action in response to the notification.

10. The inventory-handling system as recited in claim 1, wherein the management module is further configured to:
- receive a notification of a user-requested pickup location from a computing device associated with the user or the qualified user, and
- instruct at least one device of the first device or the second device to move to the user-requested pickup location.

11. A method comprising:
- receiving a first request relating to a first task to be completed by a user;
- receiving a second request relating to a second task to be completed by a qualified user;
- based at least in part on an availability of qualified users capable of handling the second task, prioritizing the first request and the second request to obtain a prioritized order of requests;
- generating a first task assignment corresponding to the first request;
- generating a second task assignment corresponding to the second request, wherein the first task assignment and the second task assignment are to be completed according to the prioritized order of requests;
- transmitting, via a communication interface of one or more computing devices, the first task assignment to a first device configured to transport users within a workspace of an inventory-handling system;
- transmitting, via the communication interface, the second task assignment to a second device configured to transport the users within the workspace;
- planning a first route associated with the first device in relation to known routes of one or more active drive units within the workspace to avoid collisions between the first device and the one or more active drive units within the workspace;
- planning a second route associated with the second device in relation to the known routes of the one or more active drive units within the workspace to avoid collisions between the second device and the one or more active drive units within the workspace;
- directing movement of the first device with the user therein to a first destination location within the workspace along the first route; and
- directing movement of the second device with the qualified user therein to a second destination location within the workspace along the second route.

12. The method as recited in claim 11, further comprising receiving a confirmation that the user has entered the first device before moving the first device.

13. The method as recited in claim 11, further comprising:
- designating an area around at least one of the first destination location or the second destination location as a protected area;
- receiving an indication that an unauthorized object has entered the protected area; and
- taking remedial action in response to receiving the indication.

14. The method as recited in claim 13, further comprising detecting the unauthorized object using a plurality of sentinel drive units positioned at a perimeter of the protected area.

15. The method as recited in claim 14, further comprising projecting a light beam from a first sentinel drive unit of the plurality of sentinel drive units toward a second sentinel drive unit of the plurality of sentinel drive units, wherein detecting the unauthorized object is based on detecting a break in the light beam.

16. The method as recited in claim 13, further comprising:
- determining that a portable object is within the protected area; and
- directing a drive unit to clear the portable object from the protected area before arrival of the first device or the second device at the at least one destination location of the first destination location or the second destination location.

17. The method as recited in claim 11, further comprising:
- providing a portable cabin to support, and at least partially surround, the user of the first device during the movement of the first device;
- positioning a drive unit underneath a platform of the portable cabin;
- docking the drive unit to the portable cabin from underneath the platform;
- lifting the portable cabin using the drive unit; and
- moving the portable cabin using the drive unit during the movement of the first device within the workspace.

* * * * *